July 7, 1936.   J. ALBRECHT   2,046,358
CLUTCH CONTROLLING TRACTOR HITCH
Filed Oct. 9, 1933
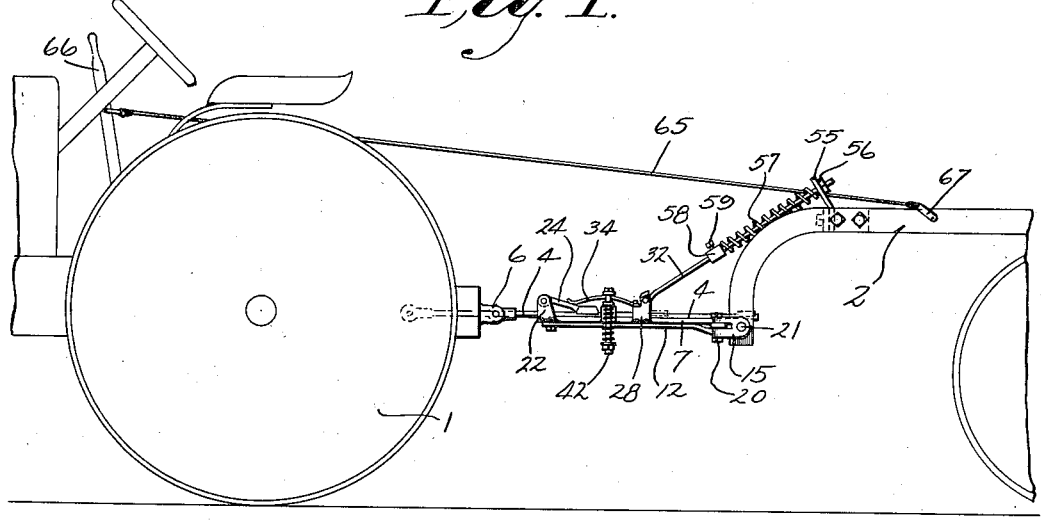
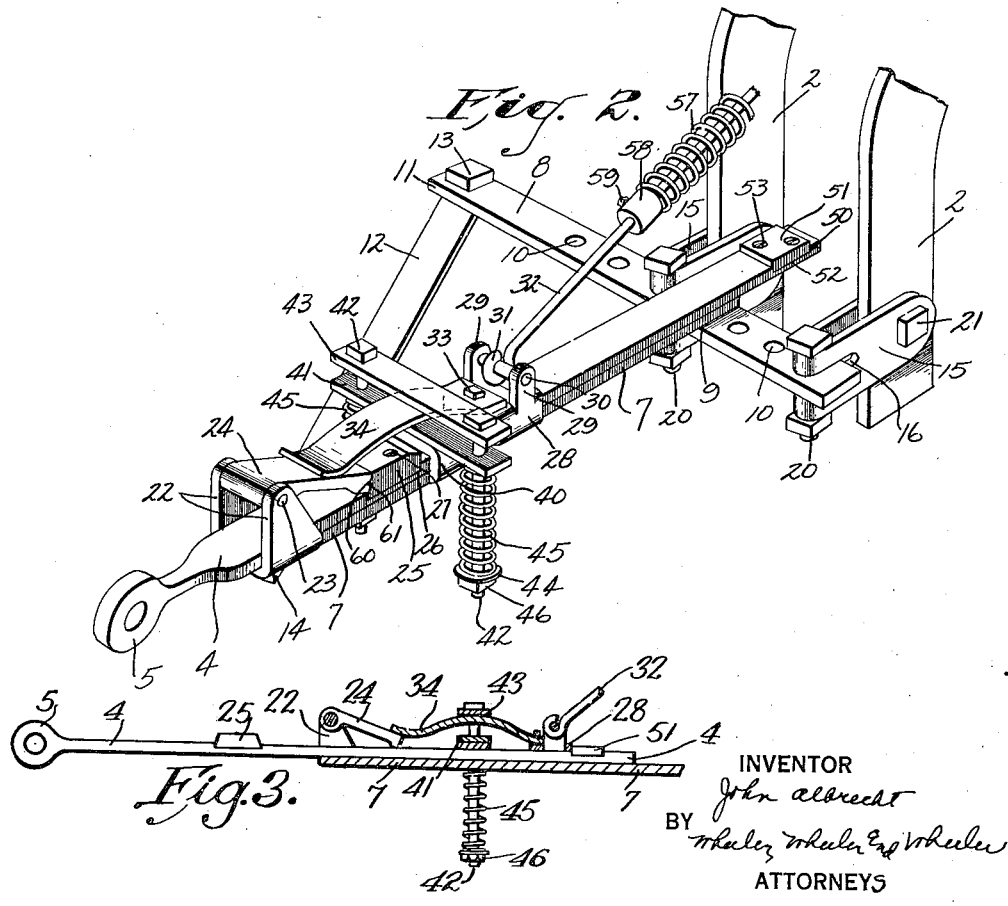
INVENTOR
John Albrecht
BY Wheeler, Wheeler & Wheeler
ATTORNEYS Patented July 7, 1936

2,046,358

UNITED STATES PATENT OFFICE 2,046,358

CLUTCH CONTROLLING TRACTOR HITCH

John Albrecht, Kewaunee, Wis.

Application October 9, 1933, Serial No. 692,813

9 Claims. (Cl. 180—14.5)

This invention relates to clutch controlling tractor hitches.

It is the principal object of this invention to provide a novel and improved form of extensible tractor hitch releasably held in one position during normal operation, for limited extension under excessive stress under circumstances such that the connection between the tractor and the device pulled thereby will be maintained.

It is a further object to provide a tractor hitch for plows and the like adapted to control the clutch of the tractor power plant when the hitch is subjected to excessive stress.

More specifically, it is an object of this invention to provide a tractor hitch comprising a pair of relatively movable parts having an automatically releasable position of engagement and a second position limiting the relative movement between said parts, the relative movement being employed to control the clutch of the tractor power plant.

In the drawing:

In Figure 1 I have shown, in side elevation, a fragmentary rear end of a tractor 1 and a fragmentary section of a trailer frame which might be the frame of a plow or similar trailing device, the tractor trailer being connected in accordance with this invention.

Figure 2 shows, in perspective, an enlarged detail of the hitch device.

Fig. 3 is a view in longitudinal section showing the parts extended to the positions indicated in dotted lines in Fig. 1.

Like parts are identified by the same reference characters throughout the several views.

The tractor 1 and trailer frame 2 are hitched together by means of a coupling arrangement including a flat tractor draw bar 4 having at one end an apertured ear 5 secured to the tractor 1 at 6, and a trailer draw bar 7 slidably engaging the tractor bar 4 and secured to the transverse bar 8 at 9. The transverse bar 8 is provided with a series of apertures 10 and is connected at its end 11 with the forward end of trailer bar 7 by means of the brace 12 and bolts 13 and 14.

The transversely adjustable bar 8 is supported by two clevises 15 slotted at 16 to receive it and U-shaped in horizontal section to receive the bolts 20 which pass through apertures 10 of transverse bar 8. The clevises 15 are each secured to the trailer frame 2 by bolts 21.

The forward end of trailer bar 7 is provided with vertically extending spaced ears 22 having a pivot pin 23 supporting the latch 24. The latch 24 engages a block 25 secured within the groove 26 of the tractor bar 4 by means of screws 27.

Intermediate its ends the trailer bar 7 is provided with a guide 28 slidably receiving the tractor bar 4. The guide collar 28 has vertically extending arms 29 carrying a pin 30 engaged by the hook 31 of the supporting rod 32.

Secured to the guide collar 28 by means of a bolt 33 is a flat spring 34 engaging the latch 24. Positioned between the forward end of the trailer bar 7 and the guide collar 28 is a spring support 40 carried by trailer bar 7 and slidably receiving the tractor bar 4. Mounted on the support 40 is a transversely disposed spring seat 41 serving as a guide for the vertically movable bolts 42. Bolts 42 are carried by a pressure plate 43 riding on spring 34, and are provided at their lower ends with spring seat washers 44 for the helical springs 45, the compression being adjustable by means of nuts 46.

At the end 50 of the tractor bar 4 is provided a block 51 seated within a groove 52 in the bar and secured therein by means of screws 53.

The supporting rod 32 passes through the bracket 55 supported by the trailer frame 2 and is provided with a nut 56 which limits the movement of the rod 32 in one direction through brackets 55. Mounted on rod 32 is a helical spring 57 disposed between the bracket 55 and the collar 58 secured to rod 32 by means of set screw 59.

The device operates as follows:

Either the tractor or the trailer may be uncoupled from the hitch device, as desired. When the apparatus is coupled for use, the latch dog 24 has its bevelled end surface 60 engaged with a complementary bevelled face 61 on the block 25, whereby the tension of the tractor on its draw bar 4 is transmitted through the block 25, the latch 24, the ears 22, and the draw bar 7 to the transverse bar 8 of the trailer.

If the trailer strikes an object which prevents further forward movement, the increased resistance of the trailer will cause block 25 to wedge beneath the bevelled face 60 of the latch dog 24 to lift the latch dog against the pressure of the flat spring 34 and the two adjustable springs 45. As soon as the dog clears block 25 the tractor draw bar 4 will be freed for movement with respect to the trailer draw bar 7 until the block 51, at the extreme end of draw bar 4, engages the fitting 28 on draw bar 7, thus positively limiting the possible relative movement of the two draw bars. The degree of such possible relative movement is shown by Fig.

3 and the dotted line position of the draw bar 4 in Fig. 1.

The amount of tension required to release the latch dog 24 is readily adjustable by means of the variation of the compression of springs 45, which results from adjustment of the nuts 46.

It will be observed in Figure 1 the trailer frame 2 is connected by a rod 65 to the clutch control lever 66 on tractor 1. Consequently, when the tractor frame and trailer frame have separated as indicated, the rod 65 will cause the lever 66 to release the clutch mechanism (which is not shown because any conventional clutch may be used). In order to provide some play between rod 65 and tractor frame 2, the rod 65 is connected with the trailer frame by means of link 67.

If the clutch control rod 65 is removed, the block 51 should also be removed so that the tractor bar 4 may be completely withdrawn from the hitch when the trailer engages an obstruction.

It is one of the advantages of the arrangement disclosed, however, that it is never necessary to completely disengage the draw bar parts of the hitch device. The coupling of two pieces of apparatus is frequently a difficult task, since it sometimes requires not only the services of one man to control the tractor but the services of another man to guide the coupling parts. Since the present hitch device provides for a limited release under excessive load without any actual uncoupling of the two draw bars, it is possible to reengage the latch dog and proceed with the trailer by merely reversing the tractor after the obstruction has been removed. Upon the reverse movement of the tractor draw bar with respect to the trailer draw bar, the latch dog will pass over the block 25 and the surfaces 60 and 61 will be automatically reengaged as shown in Figure 2.

When the tractor is uncoupled from the trailer to be put to some other use, the rod 32 will support the hitch device yieldably to facilitate the recoupling of the trailer with the ear 5, the end of the hitch device being laterally maintained in a given position by means of the brace 12.

I claim:

1. In a hitch device, the combination with a relatively slidable tractor bar and trailer bar, of a block on the slidable tractor bar having a bevelled end transversely thereof, of a latch bar pivotally carried by the trailer bar and having its fulcrum fixed respecting said bar and its free end bevelled complementary to the bevelled end of said block to be frictionally retained thereon up to a predetermined load, and resilient means normally holding said latch bar in engagement with the bevelled end of said block, said bevels being of a form to initially restrain said bars against relative movement substantially solely by friction therebetween and automatically to release said latch bar from frictional engagement with said block upon the occurrence of said predetermined load, whereby to free said tractor bar for relative movement respecting said trailer bar.

2. In a hitch device, the combination with a relatively slidable tractor bar and trailer bar, of a block on the tractor bar intermediate the ends thereof, and having a bevelled end, spaced ears on the trailer bar serving as a guide for said tractor bar, a latch bar pivoted at one end on said ears having its other end bevelled complementary to the bevelled end on said block, a guide collar on said trailer bar receiving the tractor bar and disposed in spaced relation to said ears and upon the opposite side of said block, a flexible spring arm secured to the said collar and extending therefrom into contact with said latch bar, whereby to maintain the latter normally in engagement with said block.

3. In a hitch device, the combination with a relatively slidable tractor bar and trailer bar, of a block on the tractor bar intermediate the ends thereof and having a bevelled end, spaced ears on the trailer bar serving as a guide for said tractor bar, a latch bar pivoted at one end on said ears having its other end bevelled complementary to the bevelled end on said block, a guide collar on said trailer bar receiving the tractor bar and disposed in spaced relation to said ears and upon the opposite side of said block, a flexible spring arm secured to the said collar and extending therefrom into contact with said latch bar, whereby to maintain the latter normally in engagement with said block, and a second block on said tractor bar spaced from the first mentioned block, said collar being disposed between said blocks for engagement by the second mentioned block when said latch bar is disengaged from said first mentioned block.

4. In a hitch device, the combination with a relatively slidable tractor bar and trailer bar, of a block on the tractor bar intermediate the ends thereof, and having a beveled end, spaced ears on the trailer bar serving as a guide for said tractor bar, a latch bar pivoted at one end on said ears having its other end beveled complementary to the bevelled end on said block, a guide collar on said trailer bar receiving the tractor bar and disposed in spaced relation to said ears and upon the opposite side of said block, a flexible spring arm secured to the said collar and extending therefrom into contact with said latch bar, whereby to maintain the latter normally in engagement with said block, and a guide bar disposed transversely across and secured to the trailer bar, a movable support bar paralleling the guide bar, bolts carried by the support bar and guided by the guide bar for movement therethrough, springs carried by said bolts and engaging said guide bar for opposing movement of the bolts, means on said bolts engaging said springs, said support bar being held in resilient engagement with the spring bar by said springs.

5. In a hitch device, the combination with a relatively slidable tractor bar and trailer bar, of a block on the tractor bar intermediate the ends thereof and having a bevelled end, spaced ears on the trailer bar serving as a guide for said tractor bar, a latch bar pivoted at one end on said ears having its other end bevelled complementary to the bevelled end on said block, a guide collar on said trailer bar receiving the tractor bar and disposed in spaced relation to said ears and upon the opposite side of said block, a flexible spring arm secured to the said collar and extending therefrom into contact with said latch bar, whereby to maintain the latter normally in engagement with said block, and a guide bar disposed transversely across and secured to the trailer bar, a movable support bar paralleling the guide bar, bolts carried by the support bar and guided by the guide bar for movement therethrough, springs carried by said bolts and engaging said guide bar for opposing movement of the bolts, means on said bolts engaging said springs, said support bar being held in resilient engagement with the spring bar by said springs, and a second block on said tractor bar spaced from the first mentioned block, said collar being disposed between said blocks for engagement by the second mentioned block when said latch bar is disengaged from the first mentioned block.

6. A hitch device comprising the combination with a pair of relatively slidable draw bars, of a block carried by one, a pivoted latch dog carried by the other and engageable with said block, the engaging surfaces being so sloped as to tend to slip out of engagement when pressure is applied by said draw bars, a relatively heavy spring bearing upon said latch dog and tending to maintain it engaged with said block, and a relatively light spring also exerting its pressure on said dog, said light spring being adjustable whereby to permit ready variation of the total pressure on said dog in relatively small increments.

7. A hitch device comprising the combination with a pair of relatively slidable draw bars, of a latch dog provided with fulcrum means and a support fixing said means with respect to one of said bars, said dog being inclined with its free end abutting the face of the other of said bars, means providing a shoulder on the other of said bars, the free end of said dog and the complementary face of said shoulder being beveled to afford frictional resistance to displacement until a predetermined load has been exceeded, the bevel of said shoulder means being such that upon excess load said shoulder means is adapted to lift said dog about its fulcrum toward a position of parallelism with said bars to allow said shoulder means to pass therebeneath, said bevels being of a form to initially restrain said bars against relative movement substantially solely by friction therebetween.

8. A hitch device comprising the combination with a pair of relatively slidable draw bars, of a latch dog provided with fulcrum means and a support fixing said means with respect to one of said bars, said dog being inclined with its free end abutting the face of the other of said bars, means providing a shoulder on the other of said bars, the free end of said dog and the complementary face of said shoulder being beveled to afford initial frictional resistance to displacement until a predetermined load has been exceeded, the bevel of said shoulder means being such that upon excess load said shoulder means is adapted to lift said dog about its fulcrum toward a position of parallelism with said bars to allow said shoulder means to pass therebeneath, mechanism limiting the sliding movement of said bars relative to each other when said dog is lifted, and spring means biasing said dog in a direction tending to maintain it in the inclined position aforesaid.

9. A tractor hitch comprising the combination with a pair of superposed draw bars and means guiding said bars for relative longitudinal sliding movement between a first position of substantial overlap to a second position of materially decreased overlap, of means for limiting the sliding movement of said bars beyond said relative positions, yieldable means comprising an impositive detent for maintaining said bars releasably at the first mentioned position of overlap, and means yieldably supporting the lowermost of said bars whereby to provide a yielding support upon which the uppermost of said bars is slidable without cranking.

JOHN ALBRECHT.